United States Patent
Balsa-Gonzalez et al.

(10) Patent No.: US 11,407,492 B2
(45) Date of Patent: Aug. 9, 2022

(54) CONTROL SURFACE FOR AN AIRCRAFT AND CONTROL STRUCTURE FOR AN AIRCRAFT WITH ANTI-FLUTTER BALANCE WEIGHT

(71) Applicant: AIRBUS OPERATIONS S.L.U., Madrid (ES)

(72) Inventors: Alberto Balsa-Gonzalez, Madrid (ES); Miguel Ángel Mendez Rodriguez, Madrid (ES); Robert Kobierecki, Madrid (ES); Juan Antonio Sánchez Ruiz, Toled (ES)

(73) Assignee: AIRBUS OPERATIONS, S.L.U., Madrid (ES)

( * ) Notice: Subject to any disclaimer, the term of this patent is extended or adjusted under 35 U.S.C. 154(b) by 0 days.

(21) Appl. No.: 17/081,318

(22) Filed: Oct. 27, 2020

(65) Prior Publication Data
US 2021/0122459 A1    Apr. 29, 2021

(30) Foreign Application Priority Data

Oct. 29, 2019    (EP) .................................... 19382940

(51) Int. Cl.
| | | |
|---|---|---|
| *B64C 9/30* | (2006.01) | |
| *B64C 5/02* | (2006.01) | |
| *B64C 5/06* | (2006.01) | |

(52) U.S. Cl.
CPC ................. *B64C 9/30* (2013.01); *B64C 5/02* (2013.01); *B64C 5/06* (2013.01)

(58) Field of Classification Search
CPC .... B64C 9/30; B64C 5/10; B64C 3/50; B64C 5/08; B64C 9/18
See application file for complete search history.

(56) References Cited

U.S. PATENT DOCUMENTS

| | | | |
|---|---|---|---|
| 2,859,925 A | 11/1958 | Gerin | |
| 2,930,550 A | 3/1960 | Strang | |
| 2,980,367 A | 4/1961 | Johston et al. | |
| 5,062,595 A * | 11/1991 | Maxworthy | B64C 23/06 244/214 |
| 6,497,600 B1 * | 12/2002 | Levy | B64C 17/00 446/34 |
| 2008/0149762 A1 * | 6/2008 | Baker | B64C 9/02 244/87 |
| 2009/0256025 A1 * | 10/2009 | Verde Preckler | B64C 9/00 244/87 |

FOREIGN PATENT DOCUMENTS

| | | |
|---|---|---|
| GB | 623 321 | 5/1949 |
| WO | 2008/127482 | 10/2008 |

OTHER PUBLICATIONS

Search Report for EP19382940 dated Apr. 9, 2019, 2 pages.

* cited by examiner

*Primary Examiner* — Richard R. Green
*Assistant Examiner* — William L Gmoser
(74) *Attorney, Agent, or Firm* — Nixon & Vanderhye P.C.

(57) ABSTRACT

A leading edge (3) of a control surface (1) for an aircraft includes a balance weight (6) attached to the forward-most region of the leading edge (3). The control surface (1) rotates with respect to the stabilizer (2) around a hinge line (5). The balance weight (6) is ahead of and adjacent to the most frontal portion (7) of the leading edge (3) of the control surface (1) are is inside the trailing edge of the stabilizer (2). This arrangement allows to have an anti-flutter balance weight without any impact in aerodynamic drag.

20 Claims, 10 Drawing Sheets

CONTROL SURFACE FOR AN AIRCRAFT AND CONTROL STRUCTURE FOR AN AIRCRAFT WITH ANTI-FLUTTER BALANCE WEIGHT

RELATED APPLICATION

This application claims priority to European patent application EP 19382940-5, filed Oct. 29, 2019, the entirety of which is incorporated by reference.

FIELD OF THE INVENTION

This invention refers to a control surface for an aircraft, such as an elevator or a rudder, and to a control structure suitable for installing anti-flutter balance weight with minimal aerodynamic drag.

BACKGROUND

Flutter is a phenomenon caused by aerodynamic forces which can damage elastic structures such as aircraft, bridges or buildings, for example. Flutter in aircraft causes oscillations in stabilizers and wings. The amplitude of these oscillations can become so large that it can damage such structures. As a consequence, flutter must be avoided. For this purpose stabilizers and wings in aircraft are thoroughly designed.

Most of the solutions of anti-flutter balance weight installations have aerodynamic drag penalty or big mass impact. There are different ways to install balance weights that change the control surface center of gravity to avoid structural configuration that leads to flutter. Some examples are: external mass balance, mass balance inside fuselage or balance weight in aerodynamically balanced surface.

Figure 1:
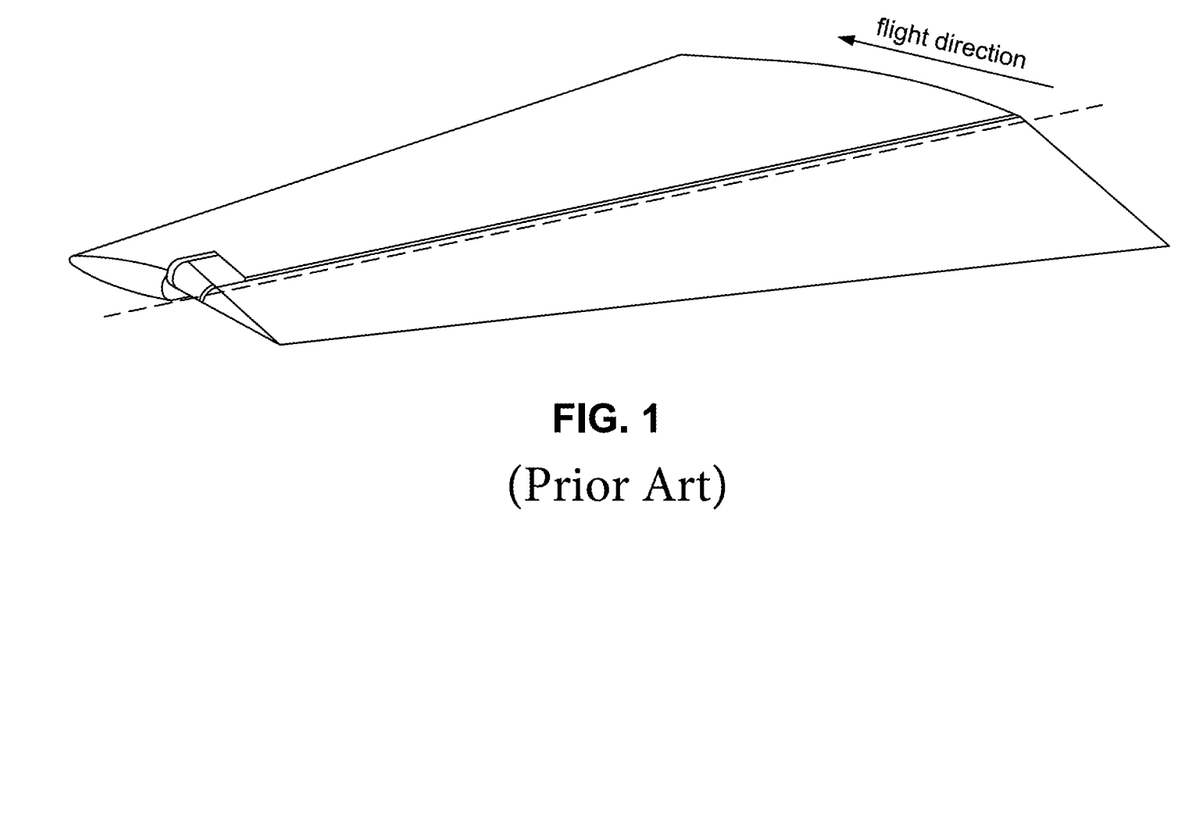
FIG. 1 shows a prior art solution that uses anti-flutter balance weights in aircraft.

Currently one solution is to locate an additional weight ahead of the hinge line in a horn-shape housing on the leading edge of a control surface (elevator or rudder), as shown in FIG. 1. This solution generates an important aerodynamic drag when the control surface is not aligned with the corresponding stabilizer. It is difficult to find the best place where to install the balance weight. In effect, some limitations are the problems with clashes due to control surface kinematics, geometrical re-striations and ergonomic requirements.

WO 2008/127482A2, entitled "Structural Dynamic Stability For An Aircraft", discloses an improvement and method for improved structural dynamic stability for 20 and 30 Series Learjet. The improvement includes a redistribution of the elevator mass balance to uncouple the elevator rotational motion from the stabilizer translation motion for the higher order horizontal frequencies having node lines in the proximity of the mass outboard counterbalance weights. The original tail section includes a rudder, and a horizontal stabilizer supporting an elevator mounted adjacent the rudder. The improved elevator includes a proximal end adjacent the rudder and a distal end that includes a counterbalance portion. The improvement further includes replacement of an original mass counterbalance weight from within the counterbalance portion with new mass counterbalance weights of less mass, and the inclusion of the additional mass counterbalance weights disposed within the elevator and interposed between the proximal and distal ends, and the counterbalance portions.

U.S. Pat. No. 2,859,925A, entitled an "Automatic Balancing Arrangement for Aircraft Control", discloses an automatic balancing arrangement for aircraft control surfaces, which is essentially constituted by at least one counter-weight arranged at the extremity of a lever-arm of sufficient length for the mass of the said counter-weight to be as small as possible, this lever not being rigidly connected to the control but pivotally-mounted upon it, and being operated by a suitable device in such manner that, when the control-surface pivots in a given direction, the lever pivots in the opposite direction, whereby, for every angular position of the control-surface, there will correspond a position of the balancing lever which is always contained within the limits of space in the wing or other member within which this lever is housed.

U.S. Pat. No. 2,980,367A, entitled a "Linked Inertial Balance For Tab", discloses, in a control surface for an aircraft, a tab pivotable about a hinge line on said control surface, first and second counter-weights having independently selectable masses-carried at opposite ends of a bar, said bar being rotatable about a pivot having the first and second counterweights onto opposite sides of the pivot axis, means linking said bar to said-tab including an arm extending downward mid-way between the counterweights and a push rod connected between the arm and tab for transferring motion of said bar to said tab to provide independently selectable amounts of dynamic balance and static balance to said tab as determined by the selected masses of said first and second counterweights.

U.S. Pat. No. 2,930,550A, entitled "Aircraft Flight Controls", discloses an elevator that has a nose portion of elliptical section projecting forwardly of its hinge axis and serving as a partial aerodynamic balance for the elevator and also serving to house weights to mass balance the elevator. The aerodynamic balancing of the elevators is substantially completed by a horn balance at the outer end of each elevator. Part of the balancing mass in each elevator is constituted by a torsion bar spring arranged near the tip of the nose portion and with its axis parallel to the hinge axis. One end of the spring is anchored to the elevator and towards its other end the spring is supported in a journal bearing carried by the elevator, the other end of the spring being provided with a lever projecting towards the hinge axis, the free end of the lever being connected by a link to a pivot carried by the tail plane so that rotation of the elevator about its hinge causes the spring to be twisted.

Great Britain Patent 623321 describes a metal control surface with a balancing mass forming the leading edge. Such configuration may provide some benefits but remains little flexible as regards the distribution of the balancing mass. It also creates complications to modify or replace the balancing weight as the whole leading edge must be disassembled and replaced. Moreover, some of the balancing weight of the leading edge of such metal control surface is relatively close to a hinging axis of the control surface, such that it adds weight to the aircraft while it has a small effect on the surface's balance.

Accordingly, there is a need to obtain control surfaces with an anti-flutter balance weight that reduces the aerodynamic drag.

SUMMARY

The invention may be embodied to provide a control surface that overcomes the drawbacks existing in the prior art systems with respect to the aerodynamic drag caused by the anti-flutter balance weight installation.

The invention provides a control surface for an aircraft comprising a leading edge and a trailing edge and able to rotate around a spanwise hinge line when assembled to at least one another portion of the aircraft, that additionally comprises a balance weight completely installed ahead of and adjacent to the most frontal portion of the leading edge, such that the balance weight comprises an external surface with a portion in contact with the leading edge and a portion not in contact with the leading edge.

The position and configuration of the balance weight of the invention prevents flutter and at the same time limits the aerodynamic drag. In some embodiments, the invention allows to prevent flutter with no impact on the aerodynamic drag of the control surface.

The invention also provides a control structure for an aircraft, comprising a control surface for an aircraft of the invention and a stabilizer that supports the control surface, the control surface being able to rotate with respect to the stabilizer around a hinge line, the stabilizer comprising a leading edge, a trailing edge and a torsion box, such that at least part of the leading edge of the control surface and the balance weight completely installed ahead of and adjacent to the most frontal portion of the leading edge of the control surface are placed inside the trailing edge of the stabilizer. At least part of the leading edge and the balance weight are placed inside the trailing edge of the stabilizer in the whole movement range, in particular in the authorized hinging angles range, of the control surface. In particular, the entire leading edge of the control surface may be placed inside the trailing edge of the stabilizer, at any hinging angle of the control surface in the stabilizer, such that it does not form a horn above the extrados or below the intrados of the stabilizer. The anti-flutter balance weight thus has no impact on the aerodynamic drag of the control surface.

The invention also provides an aircraft with the above control structures and control surfaces.

The following are some of the advantages of the invention:

It reduces weight in comparison with balance weight installed in the tip of the torsion box.

It reduces aerodynamic drag in comparison with anti-flutter medium such as an aerodynamic horn.

It does not require special (very high density) materials.

It allows to have an easy replaceable part to allow full interchangeability of control surfaces (elevators or rudders) between different types of plane.

It can be installed on new aircraft or as retrofit to existing aircraft.

Other characteristics and advantages of the present invention will be clear from the following detailed description of several embodiments illustrative of its object in relation to the attached figures.

DETAILED DESCRIPTION

Figure 2:
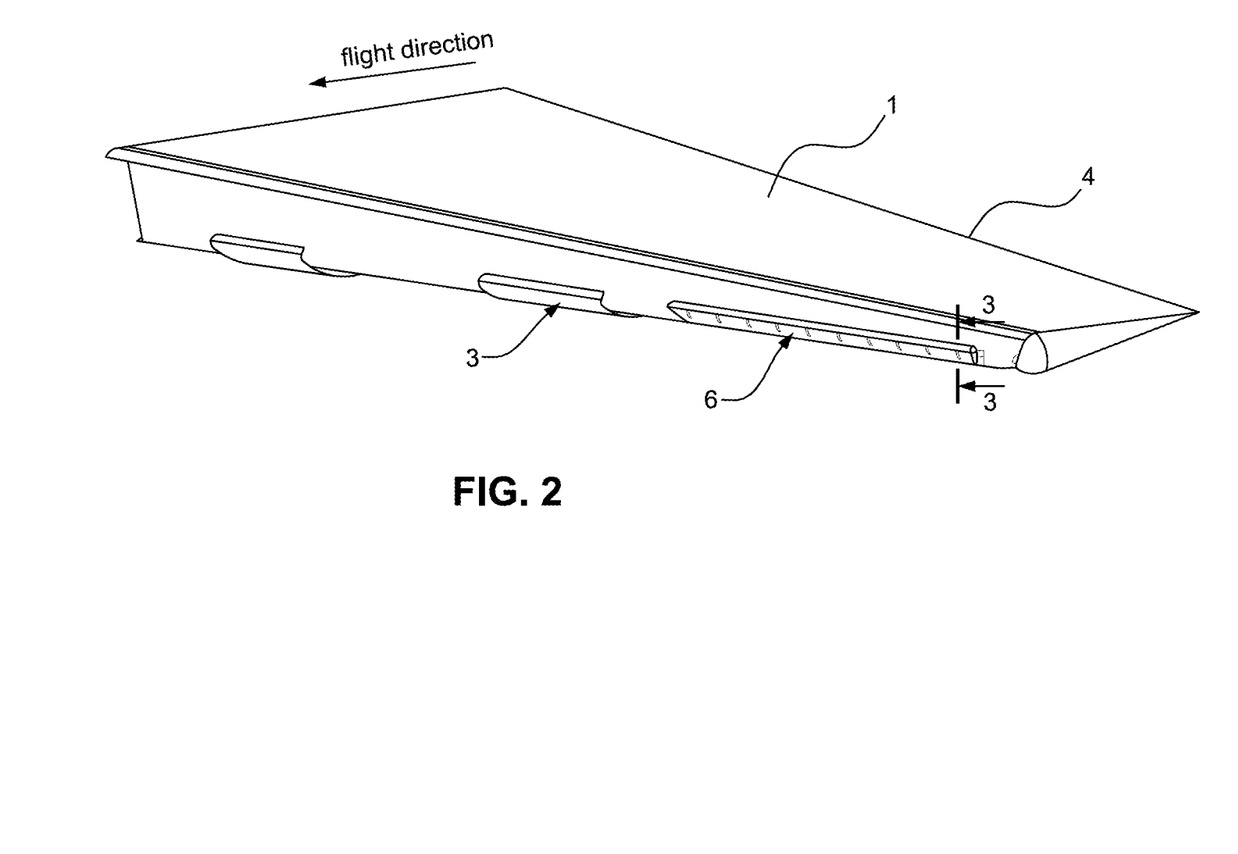
FIG. 2 shows a control surface of an aircraft with a balance weight according to the invention.

FIG. 2 shows an example of a control surface 1 of an aircraft with a balance weight 6 of the invention. In this case, an elevator is shown.

Figure 4:
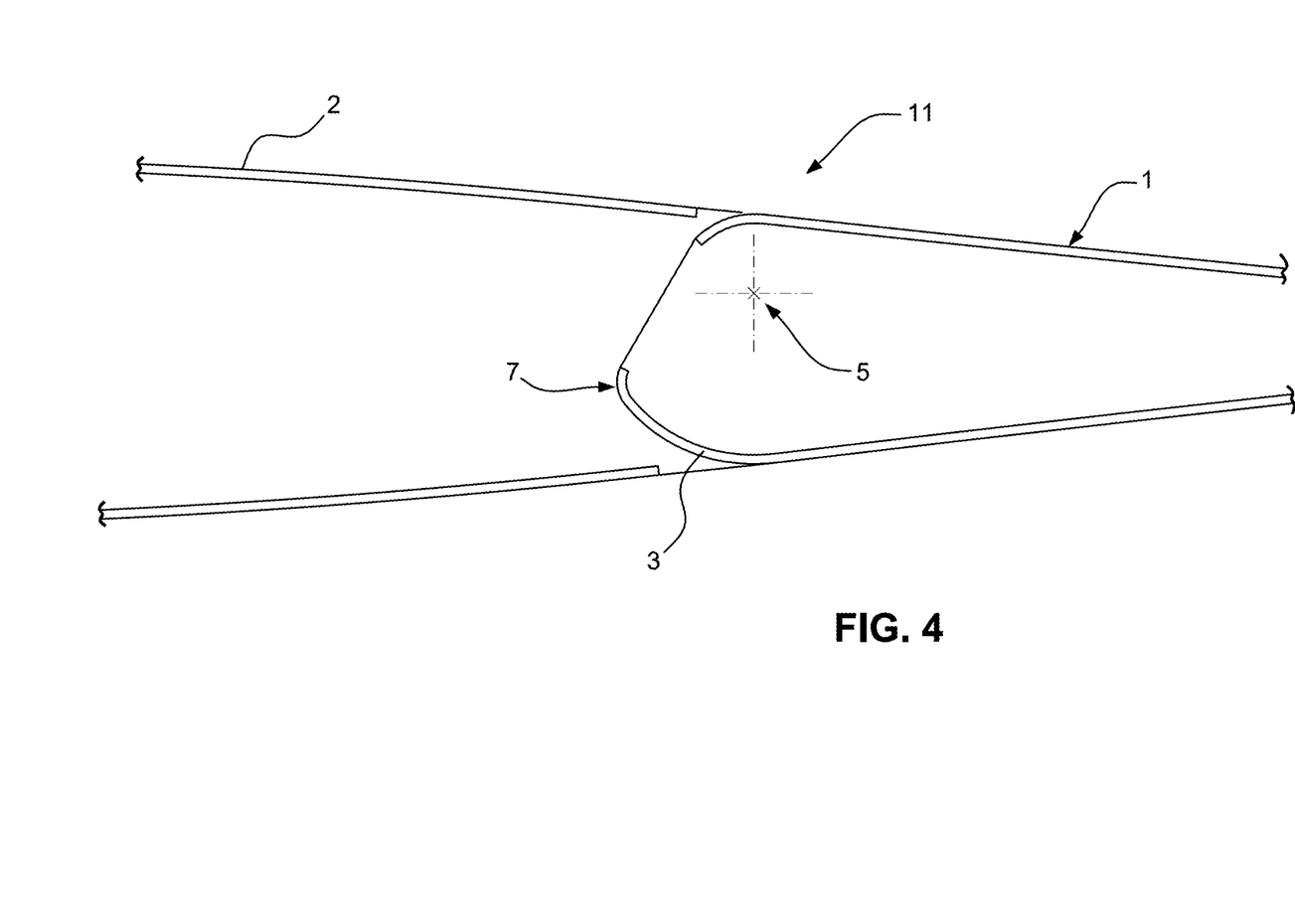
FIG. 4 shows a cross section of a control structure for an aircraft, comprising a control surface and a stabilizer, before installing the balance weight.

The control surface 1 of FIG. 2 comprises a leading edge 3 and a trailing edge 4, and is able to rotate around a hinge line 5 when assembled in the aircraft (the hinge line 5 can be seen in FIG. 4). It also comprises a balance weight 6 completely installed ahead of and adjacent to the most frontal portion 7 (FIG. 4) of the leading edge 3, taking advantage of the geometry of the control surface 1.

In FIG. 2 it can also be seen that the balance weight 6 may be a profile and it can be made of metal.

Figure 3:
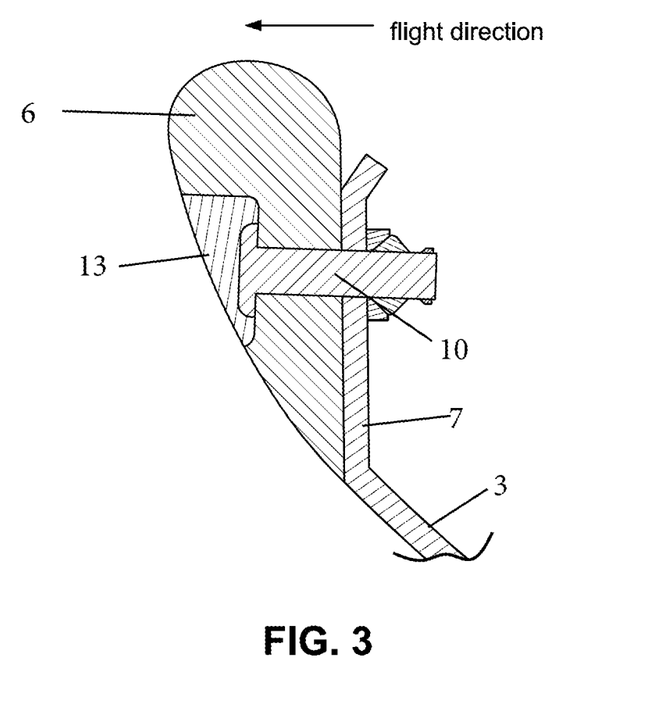
FIG. 3 shows a cross section along line 3-3 in FIG. 2.

FIG. 3 shows a cross section along line 3-3 of the balance weight 6 and the frontal portion 7 shown in FIG. 2. The balance weight 6 may be fastened to the most frontal portion 7 of the leading edge 3 of the control surface, such that the balance weight 6 is completely installed ahead of said most frontal portion 7. The balance weight may be fastened by a fastener 10 (for example, bolts and anchor nuts). A removable plug in a recess of the balance weight may cover a front end of the fastener 10 and provide a smooth outer surface that is continuous with the outer surface of the balance weight 6. The balance weight 6 may have a cross-sectional shape which is generally a tear-drop, pear or airfoil shape. The inner surface of the balance weight conforms to the outer surface of the frontal portion. The cross-sectional shape of the balance weight may be configured such that the forward surface of the balance weight forms a continuation of the curve of the leading edge of the control surface and the rear surface is flat to seat on the most frontal portion 7 of the control surface.

The flight direction, which serves as a reference for establishing relative positions, is shown in FIGS. 1, 2 and 3.

The balance weight 6 is a distinct and separable part from the leading edge 3. The balance weight 6 may be removable from the leading edge 3 and may be an optional component of the leading edge. Moreover, the installation of the balance weight 6 with fasteners 10 and the easy access to the balance weight 6 allows an easy and adequate replacement and maintenance of the balance weight. The access and removability features of the balance weight assist in allowing the balance weight 6 to be adjusted even during the exploitation of the control surface 1. Further, the removability of the balance weight 6 allows the balance weight to be interchanged with other balance weights. The balance weight 6 may also be mounted to the leading edge of control surfaces on different types of plane which need different balance weight 6 because of their own configuration.

FIG. 4 shows a control structure 11 for an aircraft, with a control surface 1 for an aircraft (as the one represented in FIG. 2) and a stabilizer 2 that supports the control surface 1. In FIG. 4, the control surface 1 is an elevator, and the stabilizer 2 is a horizontal stabilizer (HTP). The elevator rotates with respect to the horizontal stabilizer around a hinge line 5.

Figure 5:
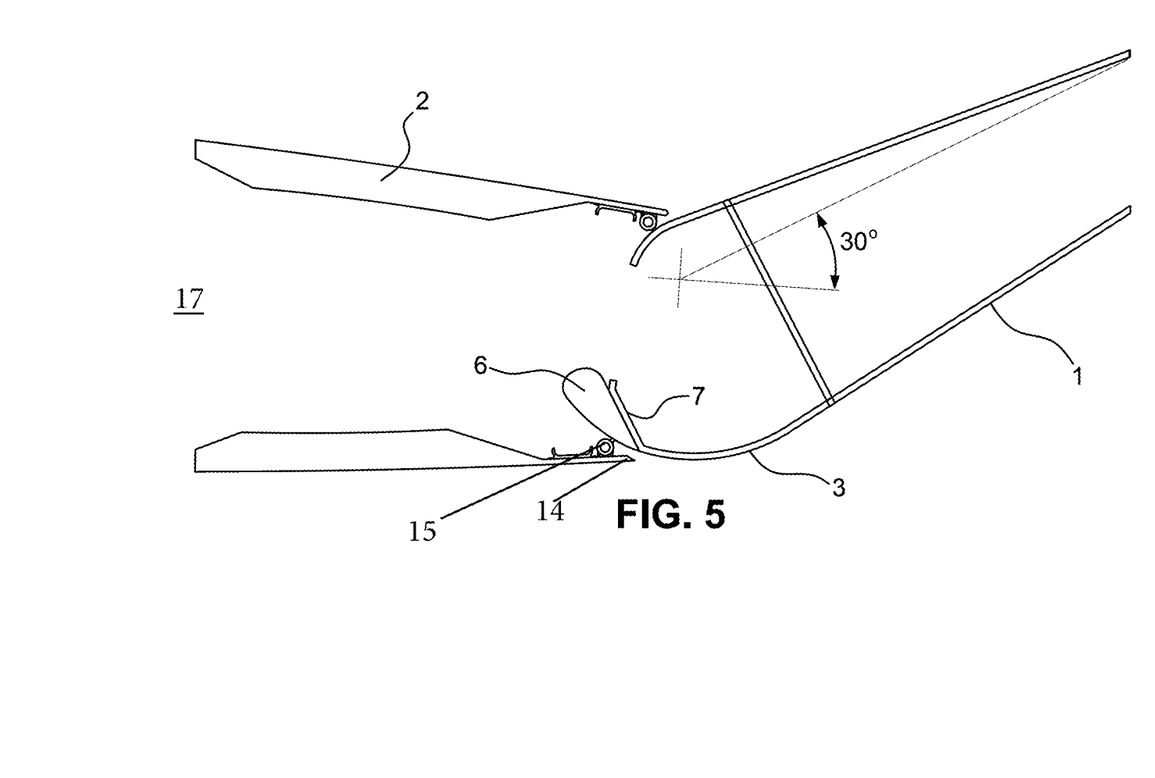
FIGS. 5 and 6 show a cross section of several positions of a control structure for an aircraft, comprising a control surface and a stabilizer, with the balance weight.
Figure 6:
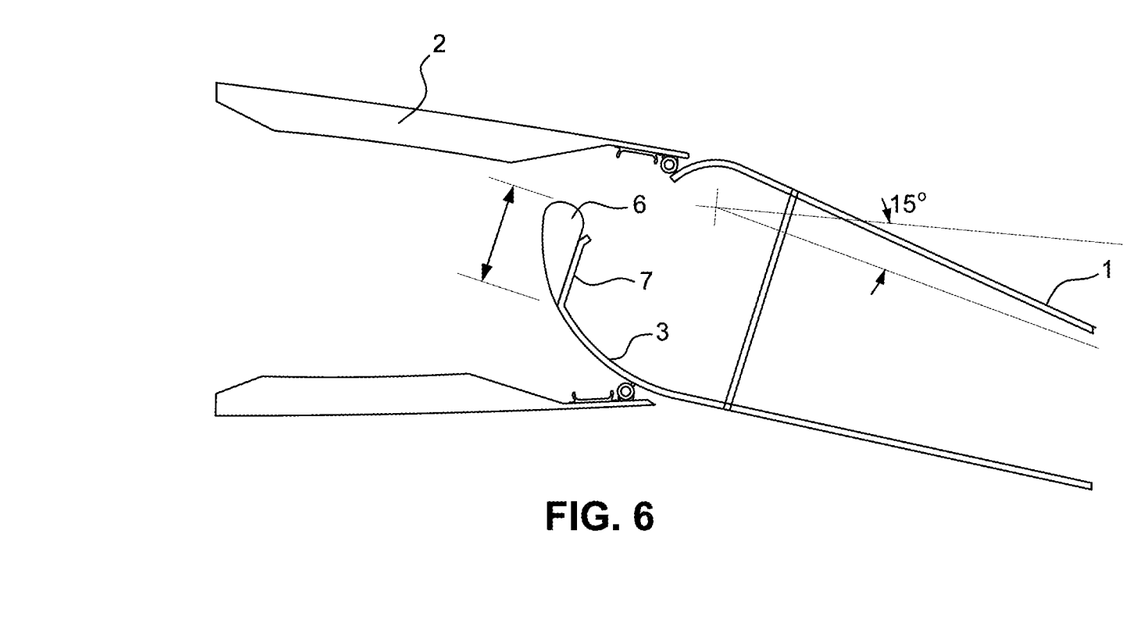
Figure 9:
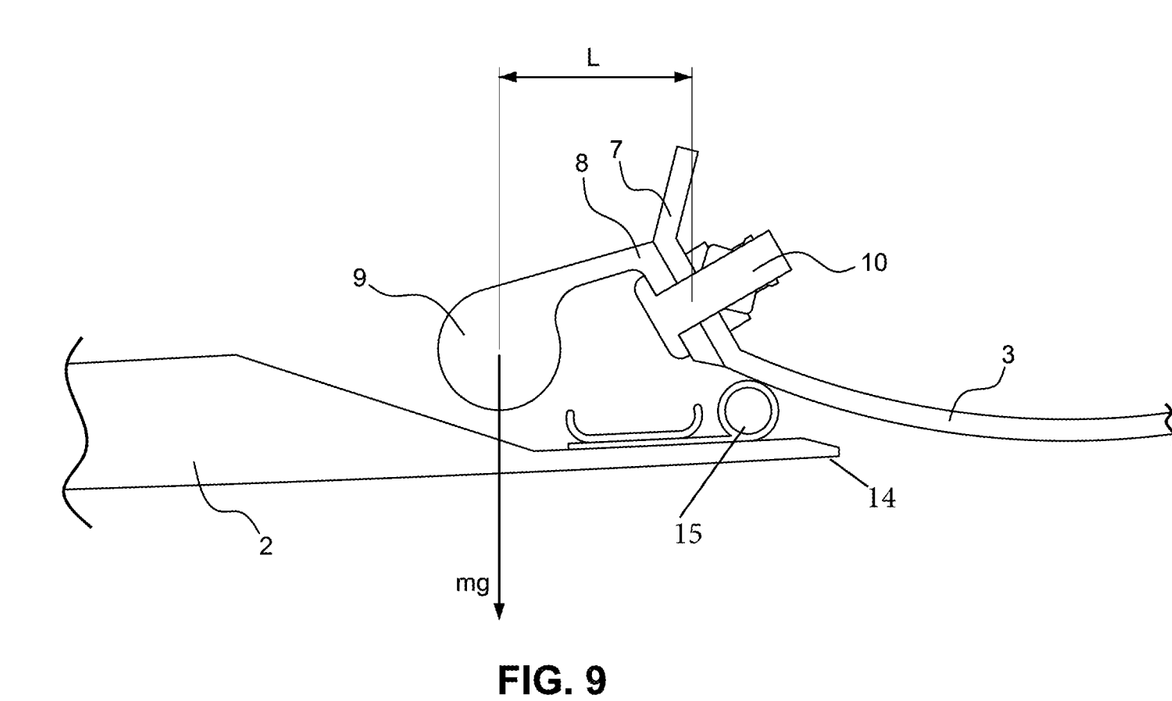
Figure 10:
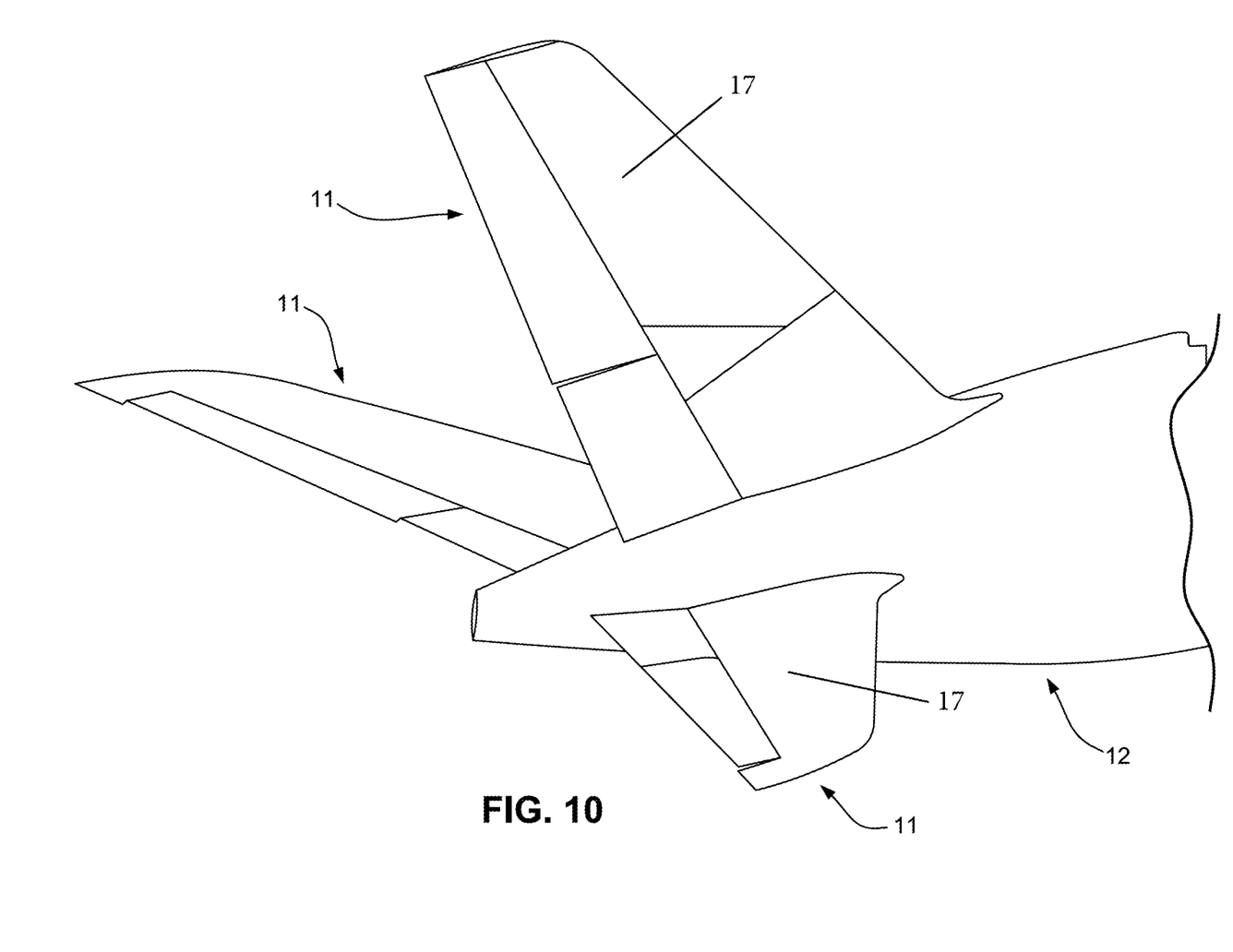
FIG. 10 shows the tail of a conventional aircraft.

FIGS. 5 and 6 show different rotation positions of the elevator (FIG. 9 at positive 30 degrees and FIG. 10 at negative 15 degrees). As it can be seen in FIGS. 5 and 6, the balance weight 6 is always inside the control structure 11 and allows full up and down elevator positions. Specifically, the balance weight 6 has a cross-sectional shape that allows the control surface to pivot about the hinge line 5 without interfering with the trailing edge 14 of the stabilizer 2. Similarly, the outer surfaces of the leading edge 3 and the balance weight 6 may be continuous and curved such that both surfaces slide against a tubular seal 15 attached to the stabilizer 2 proximate to the trailing edge 14.

Also, the horizontal stabilizer has the usual configuration, comprising a leading edge, a trailing edge and a torsion box 17. At least part of the leading edge 3 of the elevator and the balance weight 6 completely installed ahead of and adjacent to the most frontal portion 7 of the leading edge 3 of the elevator are placed inside the trailing edge of the horizontal stabilizer to avoid any aerodynamic drag augmentation.

An equivalent arrangement can be obtained for a control structure 11 for an aircraft with a rudder and a vertical stabilizer (VTP).

In an embodiment, the entire leading edge 3 of the control surface may be placed inside the trailing edge of the corresponding stabilizer at any hinging angle of the control surface in the stabilizer.

For instance, the height of the profile (balance weight 6) can be 40 mm. If a profile of steel of 40 mm high, 1.5 m long and approximately 4 cm$^2$ of cross-section is installed, a saving of 6.6 kg can be achieved.

Another way to save weight is to use different materials. For example, the above geometry made of aluminum would weigh 2.2 kg.

Figure 7:
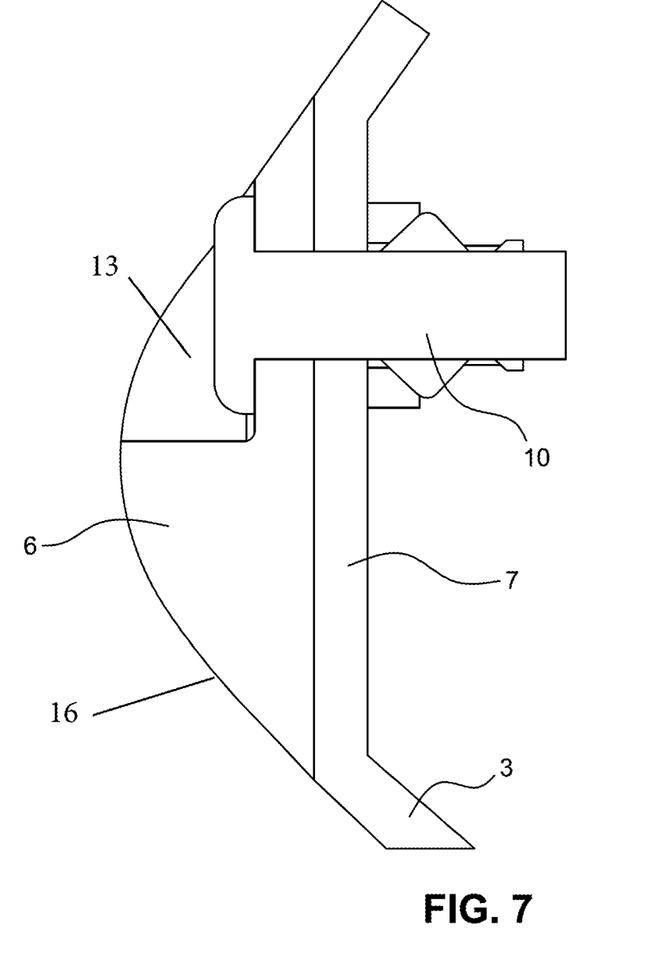
FIGS. 7, 8 and 9 show cross sections of different designs of the balance weight.

The density of the material of the balance weight 6 may be greater than the density of the material of rest of the control surface 1. If the density of the material is sufficiently great, the balance weight 6 may be shaped to have a small cross-sectional profile or a reduced length to achieve a better integration with the leading edge 3, as shown in FIG. 7. In this example the portion of the external surface of the profile not in contact with the leading edge 3 of the control surface 1 is rounded to form a continuous outer leading edge surface with the leading edge 3 of the control surface 1.

The leading edge 3 of the control surface 1 may be modified to include a recess with a flat outer surface 7 to receive the balance weight 6. The assembly of the balance weight 6 and the control surface 1 has a smooth and continuous outer leading edge surface that includes the leading edge 3 of the control surface, the outer surface 16 and the outer surface of the plug 13.

Figure 8:
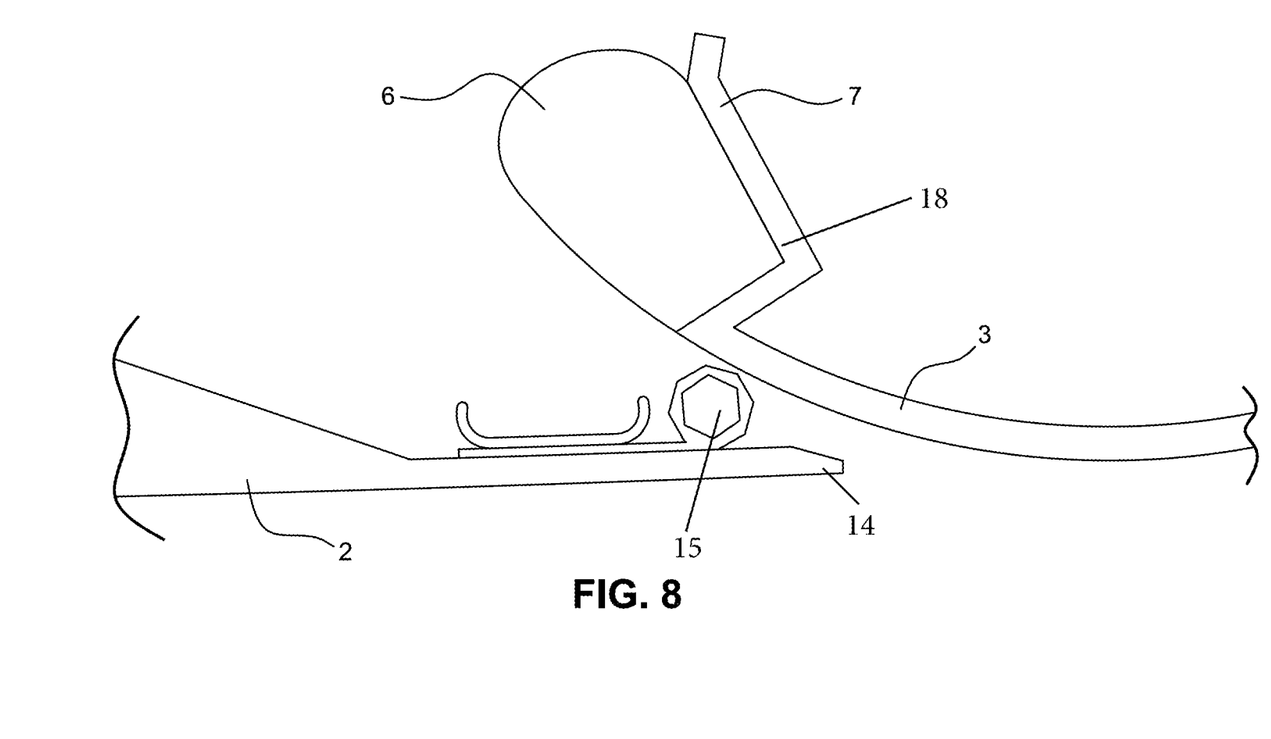

FIG. 8 shows an example of a recess 18 in the leading edge 3 of the control surface. The recess 18 receives the balance weight 6. The recess 18 may be used to avoid interference issues with the profile of the seal 15, as shown in FIG. 8.

Another option is to optimize the position of the concentration of the balance weight 6 according to a specific structure configuration, as shown in FIG. 9. In this figure the balance weight 6 comprises a first portion 8 fastened to the leading edge 3 of the control surface 1 and a second portion 9 away from the first portion 8. This option increases the distance between the second portion 9 and hinge line 5 reducing the balance weight necessary to avoid flutter.

FIG. 10 shows the tail of a conventional aircraft 12, where the relative positions of the elevator, the horizontal stabilizer 17a, the rudder and the vertical stabilizer 17b can be seen.

Although the present invention has been fully described in connection with at least one embodiment, it is evident that modifications may be introduced within the scope thereof, not considering this as limited by these embodiments, but by the contents of the following claims. While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A balance weight and control surface assembly for an aircraft comprising:
   a control surface including a leading edge and a trailing edge, wherein the control surface pivots about a spanwise hinge line, and the leading edge includes a first frontal portion and a second frontal portion spaced from the first frontal portion along a spanwise direction of the control surface; and
   a balance weight mounted to the first frontal portion of the leading edge of the control surface,
   wherein an exposed curved surface of the balance weight is aligned, along the spanwise direction of the control surface, with an exposed curved surface of the second frontal portion of the leading edge of the control surface, and
   wherein the balance weight is a separable component from the control surface.

2. The balance weight and control surface assembly according to claim 1, wherein the balance weight includes a flat surface configured to seat on the first frontal portion of the leading edge of the control surface, and the exposed curved surface of the balance weight meets the flat surface along a spanwise edge of the balance weight, wherein the spanwise edge of the balance weight is parallel to and adjacent a spanwise edge of the control surface which joins the flat surface and the exposed curved surface of the leading edge.

3. The balance weight and control surface assembly according to claim 2, wherein the balance weight is teardrop shaped in cross section.

4. The balance weight and control surface assembly according to claim 2, wherein the exposed curved section of the balance weight has a radius of curvature matching a radius of curvature of the exposed curved surface of the second frontal portion of the leading edge.

5. The balance weight and control surface assembly according to claim 2, wherein the balance weight includes a flat surface configured to seat on the first frontal portion of the leading edge of the control surface, and a rounded edge joining the flat surface to the exposed curved surface of the balance weight.

6. The balance weight and control surface assembly according to claim 1, wherein the balance weight is fastened to the first frontal portion of the leading edge by fasteners.

7. The balance weight and control surface assembly according to claim 6, wherein the fasteners include bolts and anchor nuts.

8. The balance weight and control surface assembly according to claim 1, wherein the balance weight is formed of a material having a density greater than a density of a material forming the control surface.

9. The balance weight and control surface assembly according to claim 1, wherein the balance weight is metallic and the control surface is a composite material.

10. A stabilizer of an aircraft comprising:
a leading edge;
a torsion box attached to and rearward of the leading edge, wherein a rear portion of the torsion box include an upper and lower trailing edges;
a control surface including leading edge and a trailing edge and mounted to the rear portion of the torsion box, wherein the control surface pivots about a spanwise hinge line of the stabilizer and the leading edge of the control surface is between the upper and lower trailing edges of the torsion box, wherein the leading edge of the control surface includes a first frontal portion and a second frontal portion extending forward of the first frontal portion; and
a balance weight releasably mounted to the first frontal portion of the leading edge of the control surface and positioned between the upper and lower trailing edges of the torsion box, wherein a curved exposed surface of the balance weight is aligned with a curved exposed surface of the second frontal portion along a spanwise direction of the control surface.

11. The stabilizer according to claim 10, wherein the control surface is an elevator and the stabilizer is a horizontal stabilizer.

12. The stabilizer according to claim 10, wherein the control surface is a rudder and the stabilizer is a vertical stabilizer.

13. The stabilizer according to claim 10, wherein the balance weight includes a flat surface configured to seat on the first frontal portion of the leading edge of the control surface, and the exposed curved surface of the balance weight meets the flat surface along a spanwise edge of the balance weight.

14. The stabilizer according to claim 13, wherein the spanwise edge of the balance weight is parallel to and adjacent a spanwise edge of the control surface.

15. The stabilizer according to claim 10, wherein the exposed curved surface of the balance weight has a radius of curvature in the spanwise direction which matches a radius of curvature of the exposed curved surface of the second frontal portion of the leading edge of the control surface.

16. The stabilizer according to claim 10, wherein the balance weight includes a flat surface configured to seat on the first frontal portion of the leading edge of the control surface, and a rounded edge joining the flat surface to the exposed curved surface of the balance weight.

17. The stabilizer according to claim 10, wherein the balance weight is fastened to the first frontal portion of the leading edge by fasteners.

18. The stabilizer according to claim 17, wherein the fasteners include bolts and anchor nuts.

19. The stabilizer according to claim 10, wherein the balance weight is formed of a material having a density greater than a density of a material forming the control surface.

20. The stabilizer according to claim 10, wherein the balance weight is metallic and the control surface is a composite material.

* * * * *